(12) United States Patent
Thomassin et al.

(10) Patent No.: US 11,292,604 B2
(45) Date of Patent: Apr. 5, 2022

(54) INTEGRATED HEAT MANAGEMENT FOR HYBRID PROPULSION

(71) Applicant: PRATT & WHITNEY CANADA CORP., Longueuil (CA)

(72) Inventors: Jean Thomassin, Sainte-Julie (CA); Serge Dussault, Sainte-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 689 days.

(21) Appl. No.: 15/945,003

(22) Filed: Apr. 4, 2018

(65) Prior Publication Data

US 2019/0118957 A1    Apr. 25, 2019

Related U.S. Application Data

(60) Provisional application No. 62/575,599, filed on Oct. 23, 2017.

(51) Int. Cl.
| | |
|---|---|
| *B64D 27/24* | (2006.01) |
| *B64D 15/02* | (2006.01) |
| *B64D 27/04* | (2006.01) |
| *B64D 29/00* | (2006.01) |
| *F01P 3/18* | (2006.01) |
| *F02B 63/04* | (2006.01) |
| *F02B 75/04* | (2006.01) |
| *B64D 27/02* | (2006.01) |

(52) U.S. Cl.
CPC ............. *B64D 27/24* (2013.01); *B64D 15/02* (2013.01); *B64D 27/04* (2013.01); *B64D 29/00* (2013.01); *F01P 3/18* (2013.01); *F02B 63/04* (2013.01); *F02B 75/04* (2013.01); *B64D 2027/026* (2013.01)

(58) Field of Classification Search
CPC ........ B64D 27/24; B64D 15/02; B64D 27/04; B64D 29/00; B64D 2027/026; F01P 3/18; F02B 63/04; F02B 75/04; Y02T 50/60; Y02T 10/12

See application file for complete search history.

(56) References Cited

U.S. PATENT DOCUMENTS

| | | | | | |
|---|---|---|---|---|---|
| 4,474,001 | A | * | 10/1984 | Griffin | ...................... F02C 7/16 60/204 |
| 4,504,030 | A | * | 3/1985 | Kniat | ........................ F02K 3/06 244/57 |
| 8,499,544 | B2 | * | 8/2013 | Shafer | ..................... F01D 15/10 60/266 |
| 10,384,793 | B2 | * | 8/2019 | Bustillo | .................... F02C 7/18 |
| 10,800,539 | B2 | * | 10/2020 | Niergarth | ................ B64C 21/06 |
| 2014/0369812 | A1 | * | 12/2014 | Caruel | ................... B64D 33/02 415/116 |

(Continued)

FOREIGN PATENT DOCUMENTS

EP        3228544        10/2017

*Primary Examiner* — Valentina Xavier
(74) *Attorney, Agent, or Firm* — Norton Rose Fulbright Canada LLP.

(57) ABSTRACT

There is provided a heat management system for a hybrid electrical aircraft comprising electric propulsors powered by a power plant. The heat management system comprises a heat exchanger integrated to a nacelle of at least one of the electric propulsors for dissipating heat withdrawn from the power components of the power plant into ambient air.

17 Claims, 3 Drawing Sheets

(56) References Cited

U.S. PATENT DOCUMENTS

| | | | |
|---|---|---|---|
| 2015/0377132 A1* | 12/2015 | Caruel | B64D 33/02 |
| | | | 415/116 |
| 2016/0017751 A1* | 1/2016 | Caruel | F01D 25/12 |
| | | | 415/175 |
| 2016/0137305 A1 | 5/2016 | Joubert et al. | |
| 2016/0167796 A1 | 6/2016 | Joubert | |
| 2018/0051716 A1* | 2/2018 | Cheung | B64D 33/10 |
| 2018/0127103 A1* | 5/2018 | Cantemir | F02K 3/06 |
| 2018/0229850 A1* | 8/2018 | Menheere | F02C 7/047 |
| 2018/0305036 A1* | 10/2018 | Vondrell | H02K 7/1823 |
| 2019/0003390 A1* | 1/2019 | Ramos | F02C 9/18 |
| 2019/0085765 A1* | 3/2019 | Nolcheff | F02B 43/00 |
| 2019/0257245 A1* | 8/2019 | Duge | H02K 7/1823 |
| 2019/0353103 A1* | 11/2019 | Roberge | F02C 3/04 |
| 2019/0390603 A1* | 12/2019 | Snyder | H05K 7/20309 |
| 2020/0010208 A1* | 1/2020 | Peace | F04D 25/082 |
| 2020/0108915 A1* | 4/2020 | Thomassin | F01C 21/06 |
| 2020/0122843 A1* | 4/2020 | Porte | F02C 7/047 |
| 2020/0131933 A1* | 4/2020 | Metzger | F02C 7/12 |
| 2020/0182086 A1* | 6/2020 | Marquie | F01D 9/065 |

* cited by examiner

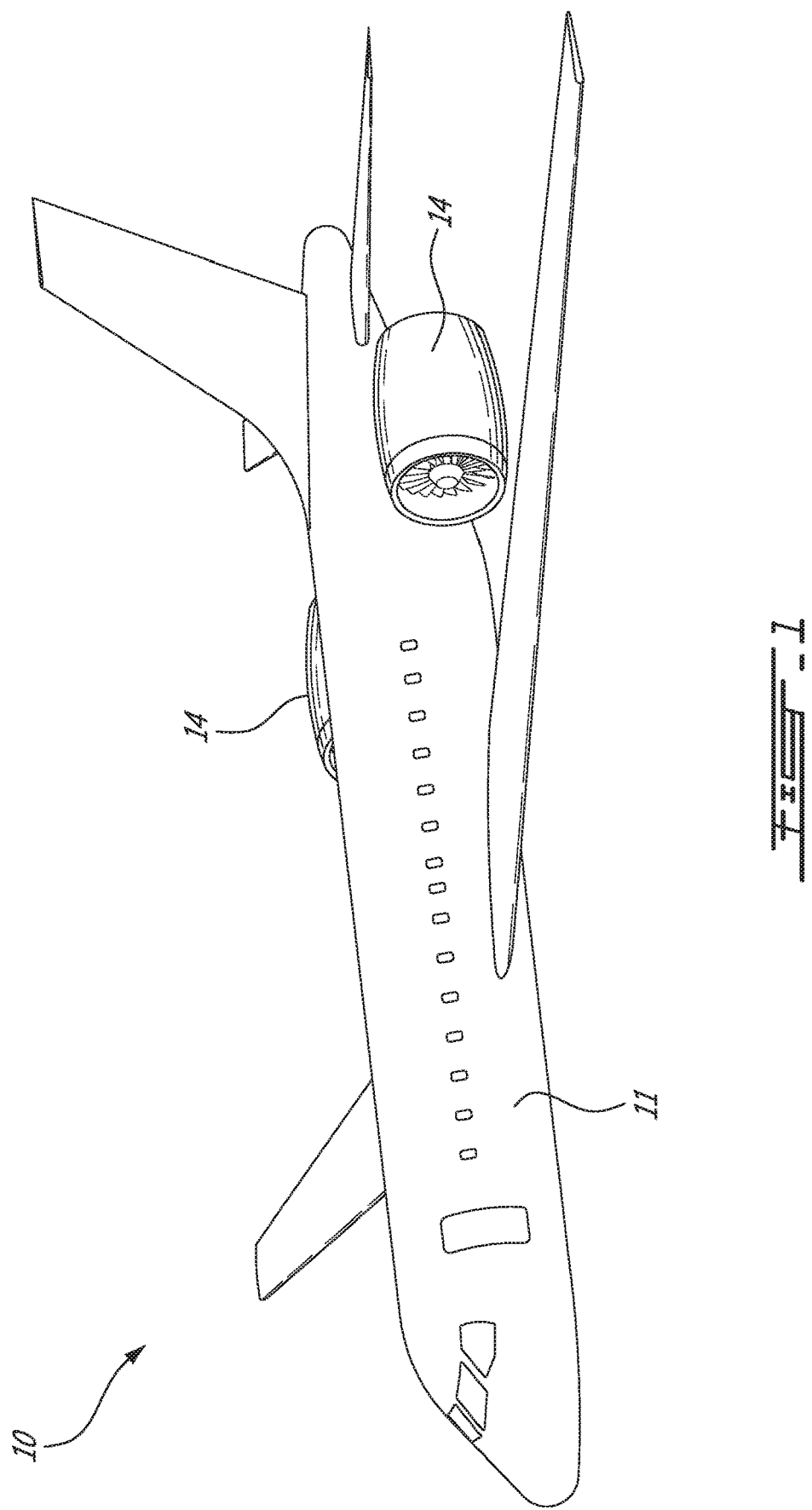

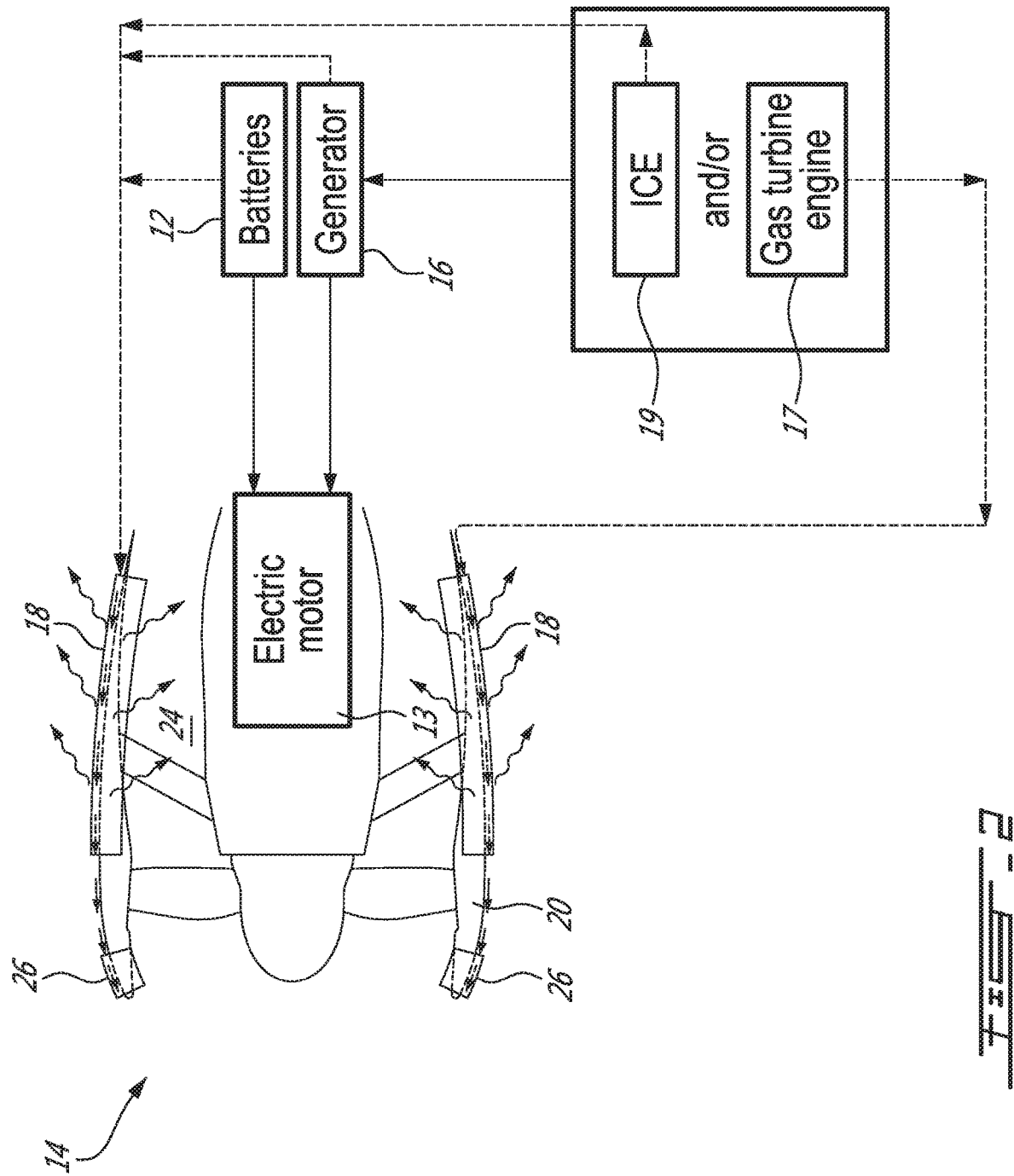

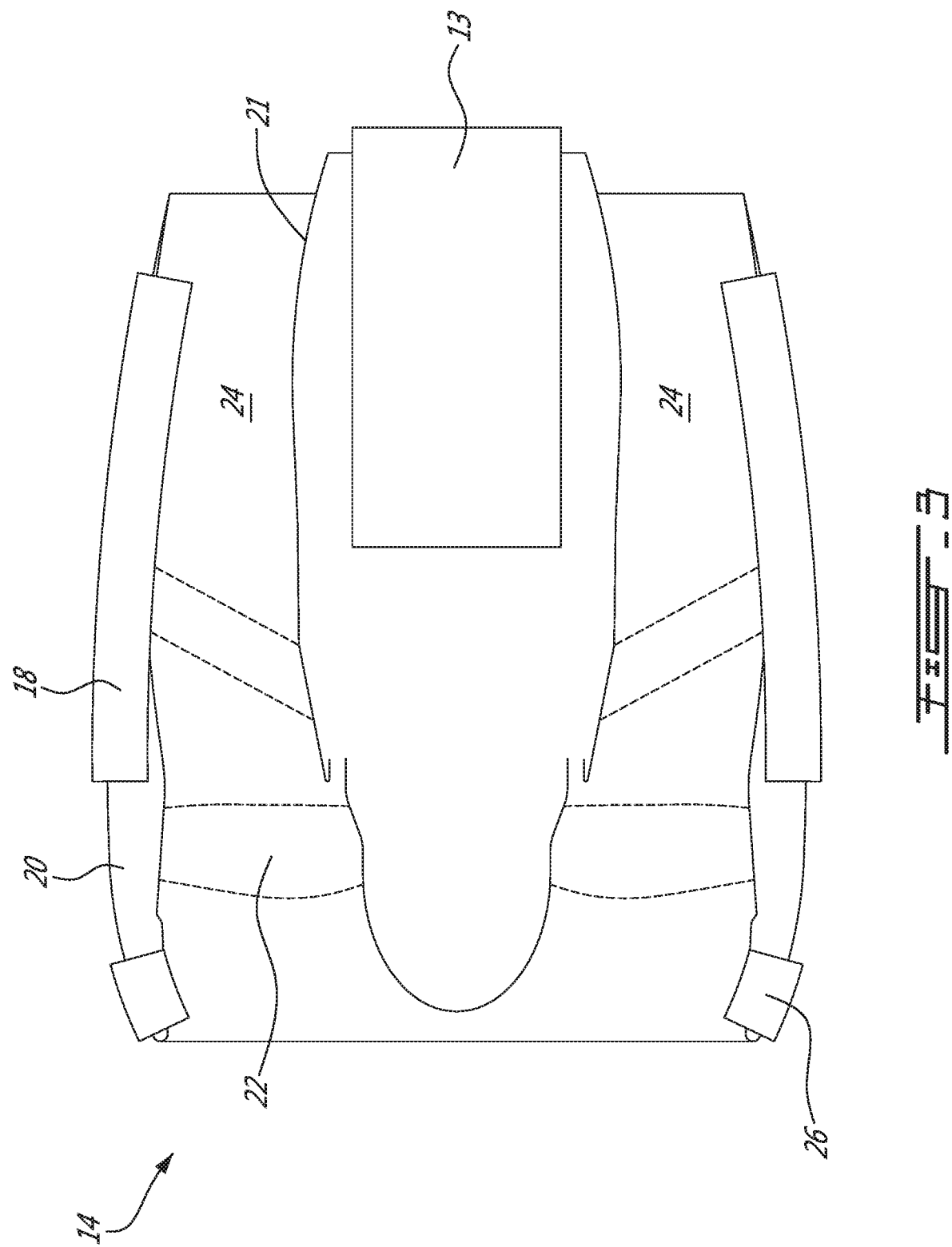

us 11,292,604 B2

INTEGRATED HEAT MANAGEMENT FOR HYBRID PROPULSION

RELATED APPLICATION

This application claims priority from U.S. Provisional Patent Application No. 62/575,599 filed Oct. 23, 2017, the entire contents of which are incorporated by reference herein.

TECHNICAL FIELD

The application relates generally to hybrid electric aircrafts and, more particularly, to a heat management system for power plants of such aircrafts.

BACKGROUND

Heretofore, the cooling of hybrid electric aircraft propulsion power plants has proven to be challenging. Typically, individual cooling systems are provided for each heat generating component of the power plant, thereby resulting in extra weight and integration complexity.

There is thus a need for a new heat management system suited for hybrid electric aircrafts.

SUMMARY

In accordance with a general aspect, there is provided a power plant for a hybrid electric aircraft, the power plant comprising: at least one electric propulsor having a nacelle housing a fan for generating thrust for the aircraft; a generator for supplying power to the at least one electric propulsor; at least one combustion engine operatively connected to the generator; a heat exchanger connected in heat exchange relationship with both the generator and the at least one combustion engine, the heat exchanger being provided at an outer duct wall of the nacelle of the at least one electric propulsor.

In accordance with another general aspect there is provided an aircraft comprising: an electric propulsor having a nacelle housing a fan driven by an electric motor; a source of power for supplying power to the electric propulsor, the source of power including a battery pack and a generator; a combustion engine operatively connected to the generator; and a common cooling system for the battery pack, the generator and the combustion engine, the common cooling system comprising a heat exchanger integrated to the nacelle of the electric propulsor downstream of the fan.

In accordance with a still general aspect, there is provided a method of managing heat generated by a power plant of an aircraft having electric propulsors powered at least in part by a generator operatively connected to a combustion engine, the method comprising: withdrawing heat from the generator and the combustion engine and dissipating the heat in ambient air outside the aircraft via a heat exchanger operatively connected to both the generator and the combustion engine.

DESCRIPTION OF THE DRAWINGS

Reference is now made to the accompanying figures in which:

FIG. 1 is a schematic isometric view of a hybrid electric aircraft having a pair of electric propulsors mounted on opposed sides of the aircraft fuselage;

FIG. 2 is a schematic view of a power plant for supplying power to the electric propulsors of the aircraft; and FIG. 3 is a schematic cross-section view of one of the electric propulsors of the aircraft and illustrating an example of an integration of a heat management system into the nacelle of the propulsor.

DETAILED DESCRIPTION

Referring to FIG. 1, there is shown an example of a hybrid electric aircraft 10 including a pair of electric propulsors 14 mounted on opposed sides of the aircraft fuselage 11 for generating thrust for the aircraft 10. As show in FIG. 3, each electric propulsor 14 may be provided in the form of a ducted fan including a nacelle 20 housing a fan 22 driven in rotation by an electric motor 13 mounted inside a centerbody 21 downstream of the fan 22. An annular air passage 24 is defined between a radially inner surface of the nacelle 20 and a radially outer surface of the centerboby 21 for ducting the external air drawn by the fan 22. As shown in FIG. 3, the air passage 24 may have a converging cross-section profile or nozzle shape to further accelerate the stream of air drawn by the fan 22 in order to generate greater thrust for the aircraft 10.

As shown in FIG. 2, various sources of power may be used for supplying electric energy to the electric propulsors 14. For instance, the source of power may comprises a battery pack 12 or another suitable energy storage unit and/or an electrical generator 16.

The electrical generation can be provided by a combustion engine driving the generator 16. The combustion engine can adopt various forms, such as a conventional gas turbine engine, an internal combustion engine (ICE) having a variable volume combustion chamber (e.g. a piston engine or a Wankel engine), or a compounded engine (e.g. an ICE integrated to a gas turbine engine). According to one embodiment, the electrical generation is provided at least in part by a conventional gas turbine engine 17 driving generator 16, which, in turn, supply electric energy to the electric motors 13 of the propulsors 14. According to another embodiment, the generator 16 could be solely driven by an internal combustion engine (ICE) 19, such as a piston engine or a Wankel engine, having a variable volume combustion chamber. According to a further variant, a compounded engine comprising a gas turbine engine and an ICE may be provided to drive the generator 16. It is also understood that the generator 16 could be operatively connected to both an ICE and a gas turbine engine. Various combination of fuel powered engines are contemplated.

In operation, the various elements of the power plant, including the batteries 12, the generator 16, the gas turbine engine 17, the ICE 19 and/or the compounded engine need to be cooled. While conventional gas turbine engines are typically air cooled using a small % amount of the main engine air, the batteries 12, the generator 16 and the ICEs are typically cooled by separate liquid-based cooling systems. Such systems typically comprise a heat exchanger defining a coolant circuit through which a coolant (e.g. a liquid or gas) is circulated to remove heat from the parts to be cooled.

It is herein proposed to combine all the cooling systems into one and to integrate the combined cooling system into the aircraft external envelope, which is exposed to ambient air. For instance, in the case of the exemplified fixed wing aircraft equipped with electric propulsors 14, heat exchangers 18 could be integrated to the propulsors nacelle 20 in order to effectively dissipate the heat picked up by the liquid coolant from batteries 12, the generator 16 and the ICE 19.

More particularly, in the case of a ducted fan having a fan 22 mounted in a nacelle 20 including an outer duct wall circumscribing an air passage 24 as shown in FIG. 3, a heat exchanger 18 could be integrated to the outer duct wall of the nacelle 20 downstream of the fan 22 to dissipate the combined heat of the ICE, batteries 12 and/or electrical generator 16 into the stream of air flowing through the air passage 24, thereby increasing the energy of the air propelled by the fan 22 and, thus, improving the performance of the propulsors 14. This can, for instance, be achieved by integrating an annular liquid-air heat exchanger in the outer duct wall of the air passage 24. In operation, the liquid coolant is circulated to pick up heat from the batteries 12, the generator 16 and the ICE 19 and is then routed through the heat exchanger 18 where heat from the liquid coolant is transferred to ambient air flowing over the nacelle and to the air flowing through the air passage 24 of the ducted propulsors 14 for generating thrust for the aircraft 10.

As schematically shown in FIG. 3, an additional heat exchanger 26 could be integrated in a front lip portion of the propulsor nacelle 20 upstream of the fan 22 to perform a lip de-icing function. Indeed, a portion of the heat withdrawn from the batteries 12, the generator 16 and/or the ICE by the liquid coolant could be re-used to de-ice the nacelle inlet lip 26 without any impact on engine specific fuel consumption (SFC). This would be an improvement over traditional de-icing system which uses either engine bleed or power extraction with a SFC increase.

Also, the exhaust gases of the ICE 19, gas turbine engine 17 and/or compounded engine of the aircraft power plant could be discharged in the air passage 24 of the propulsor nacelle 20 downstream of the heat exchanger 18 to further energize the air discharged from the electric propulsors 14 (i.e. the airflow stream of the fan according to the illustrated example). Effects A, B & C shown in FIG. 3 could be used in combination or individually as a way to optimize the integration of a liquid cooled engine into hybrid electric aircrafts.

The above description is meant to be exemplary only, and one skilled in the art will recognize that changes may be made to the embodiments described without departing from the scope of the invention disclosed. For instance, only heat withdrawn from the liquid cooled engine could be dissipated through the propulsor nacelle. Alternatively, when the generator is driven by a conventional gas turbine engine, only the heat generated by the generator and/or the batteries could be dissipated via heat exchangers integrated to the nacelle of the propulsors. Also it is understood that it is not necessarily all the heat generated by the batteries the generator and the ICE that is dissipated through the propulsor nacelles. Indeed, additional heat exchangers could be provided on aircraft fuselage if the amount of heat to dissipate is too important. Lastly, it is understood that the aircraft could comprises any number of electric propulsors. Any modifications which fall within the scope of the present disclosure will be apparent to those skilled in the art, in light of a review of this disclosure, and such modifications are intended to fall within the appended claims.

The invention claimed is:

1. A power plant for a hybrid electric aircraft, the power plant comprising:
   at least one electric propulsor having a nacelle housing a fan for generating thrust for the aircraft, wherein the nacelle defines an air passage for ducting a stream of air drawn by the fan;
   a generator for supplying power to the at least one electric propulsor;
   at least one combustion engine operatively connected to the generator; and
   a heat exchanger connected in heat exchange relationship with both the generator and the at least one combustion engine, the heat exchanger being provided at an outer duct wall of the nacelle of the at least one electric propulsor to dissipate combined heat from the generator and the at least one combustion engine into the stream of air drawn into the air passage by the fan;
   wherein the at least one combustion engine has an exhaust gas section in flow communication with the air passage of the nacelle to discharge exhaust gases into the air passage downstream of the heat exchanger such as to further energize the air discharged from the at least one electric propulsor.

2. The power plant defined in claim 1, wherein the at least one combustion engine comprises an internal combustion engine (ICE) having a variable volume combustion chamber, the ICE being liquid cooled, and wherein the heat exchanger is a liquid-air heat exchanger.

3. The power plant defined in claim 1, further comprising a battery pack for supplying power to the at least one electric propulsor, the heat exchanger being also connected in heat exchange relationship with the battery pack to dissipate combined heat from the battery pack, the at least one combustion engine and the generator.

4. The power plant defined in claim 3, wherein the at least one combustion engine comprises a gas turbine engine and an internal combustions engine (ICE), and wherein the heat exchanger is exposed to ambient air and is in heat exchange relationship with the generator, the battery pack and the ICE to dissipate combined heat therefrom into the ambient air.

5. The power plant defined in claim 1, wherein heat dissipated by the heat exchanger is routed to an inlet lip of the nacelle of the at least one electric propulsor to perform a de-icing function.

6. The power plant defined in claim 1, wherein the heat exchanger is disposed at an outer flow boundary of the air passage.

7. The power plant defined in claim 6, wherein the at least one combustion engine comprises a gas turbine engine and an internal combustions engine (ICE).

8. An aircraft comprising:
   an electric propulsor having a nacelle housing a fan driven by an electric motor, the nacelle circumscribing an air passage for directing a stream of air drawn by the fan;
   a source of power for supplying power to the electric propulsor, the source of power including a battery pack and a generator;
   a combustion engine operatively connected to the generator; and
   a common cooling system for the battery pack, the generator and the combustion engine, the common cooling system comprising a heat exchanger integrated to the nacelle of the electric propulsor downstream of the fan, the heat exchanger disposed to discharge heat into the stream of air flowing through the air passage;
   wherein the combustion engine has an exhaust section fluidly connected to the air passage and configured to discharge combustion gases into the air passage downstream of the heat exchanger.

9. The aircraft defined in claim 8, wherein the combustion engine comprises an internal combustion engine (ICE) having a variable volume combustion chamber, and wherein the common cooling system comprises a coolant circuit through which a coolant is circulated to pick up heat from the battery pack, the generator and the ICE, the coolant circuit extending through the heat exchanger for dissipating heat carried by the coolant into ambient air.

10. The aircraft defined in claim 8, wherein the nacelle has an inlet lip, and wherein the cooling system further comprises an additional heat exchanger integrated to the inlet lip, the additional heat exchanger being connected in heat exchange relationship with the battery pack, the generator and the combustion engine.

11. A method of managing heat generated by a power plant of an aircraft having electric propulsors powered at least in part by a battery pack and a generator, the generator operatively connected to a combustion engine, the method comprising: withdrawing heat from the battery pack, the generator and the combustion engine and dissipating the heat in ambient air outside the aircraft via a heat exchanger operatively connected to the battery pack, the generator and the combustion engine.

12. The method of claim 11, wherein withdrawing heat comprises circulating a coolant in heat exchange relationship with the battery pack, the combustion engine and the generator, and wherein dissipating heat comprises circulating the coolant through the heat exchanger.

13. The method of claim 12, comprising transferring heat from the coolant to a flow of air propelled by the electric propulsors to generate thrust for the aircraft.

14. The method of claim 12, comprising using the heat carried by the liquid coolant to de-ice an inlet lip of the nacelle of the electric propulsors.

15. The method of claim 13, wherein each of the electric propulsors has a nacelle circumscribing an air passage, and wherein the method further comprises directing exhaust gases from the combustion engine into the air passage to further energize the flow of air downstream of the heat exchanger.

16. The method of claim 12, wherein withdrawing heat comprises using the same coolant for removing heat from the battery pack, the generator and the combustions engine.

17. The method of claim 16, wherein the heat exchanger is mounted to an outer duct wall of a nacelle of the electric propulsor, and wherein the combustion engine a liquid cooled internal combustion engine (ICE).

* * * * *